United States Patent
Kodama et al.

(10) Patent No.: US 11,926,058 B2
(45) Date of Patent: Mar. 12, 2024

(54) INFORMATION PROVIDING DEVICE, INFORMATION PROVIDING METHOD AND PROGRAM

(71) Applicant: FUJI CORPORATION, Chiryu (JP)

(72) Inventors: Seigo Kodama, Yatomi (JP); Masatoshi Fujita, Anjo (JP)

(73) Assignee: FUJI CORPORATION, Chiryu (JP)

( * ) Notice: Subject to any disclaimer, the term of this patent is extended or adjusted under 35 U.S.C. 154(b) by 315 days.

(21) Appl. No.: 16/956,636

(22) PCT Filed: Dec. 28, 2017

(86) PCT No.: PCT/JP2017/047219
§ 371 (c)(1),
(2) Date: Jun. 22, 2020

(87) PCT Pub. No.: WO2019/130543
PCT Pub. Date: Jul. 4, 2019

(65) Prior Publication Data
US 2021/0094183 A1    Apr. 1, 2021

(51) Int. Cl.
*B25J 9/16*    (2006.01)

(52) U.S. Cl.
CPC ........... *B25J 9/1671* (2013.01); *B25J 9/1661* (2013.01)

(58) Field of Classification Search
CPC ..................................................... B25J 9/1671
See application file for complete search history.

(56) References Cited

U.S. PATENT DOCUMENTS 6,944,584 B1    9/2005 Tenney et al.
10,724,963 B2 *  7/2020 Yoshida ................. B25J 9/1671
(Continued)

FOREIGN PATENT DOCUMENTS

CN           107530879 A        1/2018
DE    10 2010 004 477 A1        7/2011
(Continued)

OTHER PUBLICATIONS

International Search Report dated Apr. 3, 2018 in PCT/JP2017/047219 filed Dec. 28, 2017, 2 pages.

*Primary Examiner* — Jeff A Burke
*Assistant Examiner* — Arslan Azhar
(74) *Attorney, Agent, or Firm* — Oblon, McClelland, Maier & Neustadt, L.L.P.

(57) ABSTRACT

An information providing device includes a storage section configured to register and store work information related to a work robot and information on processing models related to the structures, an operation program configured to execute an operation of a work system in a virtual space by using information on the structures and information on a processing model related to the structures; and a control section configured to acquire selection information in which the information on the two or more structures and the processing model related to the structures stored in the storage section are selected, read the information on the structures and the information on the processing model included in the selection information from the storage section, execute processing of the processing model in a state in which the two or more structures are connected by the operation program in the virtual space, and output an executed processing result.

19 Claims, 9 Drawing Sheets

(56) References Cited

U.S. PATENT DOCUMENTS

| | | | |
|---|---|---|---|
| 2007/0293986 A1 | 12/2007 | Nagatsuka et al. | |
| 2008/0114492 A1 | 5/2008 | Miegel et al. | |
| 2012/0327224 A1* | 12/2012 | Nomura | B25J 9/1671 901/46 |
| 2018/0079078 A1* | 3/2018 | Nagatsuka | B25J 9/1682 |
| 2019/0160678 A1* | 5/2019 | Zhang | B25J 9/1664 |

FOREIGN PATENT DOCUMENTS

| | | |
|---|---|---|
| EP | 3 226 196 A1 | 10/2017 |
| JP | 7-214485 A | 8/1995 |
| JP | 2007-334678 A | 12/2007 |
| JP | 2011-186928 A | 9/2011 |
| JP | 2012-56002 A | 3/2012 |
| JP | 2015-100866 A | 6/2015 |
| WO | WO 2016/185590 A1 | 11/2016 |

* cited by examiner

INFORMATION PROVIDING DEVICE, INFORMATION PROVIDING METHOD AND PROGRAM

TECHNICAL FIELD

In the present specification, an information providing device, an information providing method, and a program are disclosed.

BACKGROUND ART

Conventionally, as a method of constructing a manufacturing system for performing work on a workpiece, there has been proposed a method of preparing a main body device having a main frame and a control device, and a working element execution device, and then assembling the working element execution device to the main frame of the main body device, by which the control device is set to control the working element execution device in an integrated manner (for example, refer to Patent Literature 1). With this construction method, it is possible to construct a manufacturing system having high versatility.

PATENT LITERATURE

Patent Literature 1: JP-A-2012-56002

BRIEF SUMMARY

Technical Problem

For example, when an attempt is made to construct a work system with one or more work robots to perform a specific work on a specific workpiece, the engineer has to select a work robot that is compatible with the work, purchase this work robot, perform positioning, and the like using a teaching pendant and the like, and then set the operation of the work robot with field teaching. As described above, constructing a work system requires a high teaching skill of an engineer. In addition, since a work robot may have a limited work range and work contents, an engineer may not be able to grasp whether a work can be executed unless a work robot is purchased and a system is assembled. When it is found that there is an obstacle to execute the work after the work system is assembled, it is not easy to construct the work system because the engineer needs to make further changes or the like.

The present disclosure has been made in view of such problems, and a main object thereof is to provide an information providing device and an information providing method capable of more easily executing construction of a work system.

Solution to Problem

The present disclosure employs the following means in order to achieve the above-mentioned main object.

The information providing device of the present disclosure is an information providing device used in a work system including a work robot configured to perform a predetermined work on a workpiece, the information providing device includes: a storage section which registers and stores information on two or more structures related to the work robot and information on one or more processing models related to the structures; an operation program configured to execute an operation of the work system in a virtual space by using information on the structures and information on a processing model related to the structures; and a control section configured to acquire selection information in which the information on the two or more structures and the processing model related to the structures stored in the storage section are selected, read the information on the structures and the information on the processing model included in the selection information from the storage section, execute processing of the processing model in a state in which the two or more structures are connected by the operation program in the virtual space, and output an executed processing result.

The information providing device registers information on two or more structures related to the work robot and information on one or more processing models related to the structures. The information providing device has an operation program for executing the operation of the work system in the virtual space by using the information on the structure and the information on the processing model related to the structure. The information providing device is configured to: acquire selection information, in which the information on the two or more structures and the processing model related to the structures are selected; read the information on the structures and the information on the processing model included in the selection information, executes, by an operation program, processing of the processing model in a virtual space in a state in which the two or more structures are connected, and output the executed processing result. The operator who is the customer or the manufacturer can check how the processing is executed in the virtual space when multiple structures are combined based on the output processing result without actually constructing the work system. Therefore, in this information providing device, the construction of the work system can be more easily executed. Here, the "structure" includes, for example, a part or all of the work robot, a member mounted on the work robot, a member disposed around the work robot, and the like. Further, the "processing result" includes, for example, the state of the operation and the captured image of the structure, such as a determination result in the image processing. The "processing result" specifically includes at least one of the presence or absence of interference between the work robots (structures) to each other, whether pick-up, holding, or movement of the workpiece is possible, the presence or absence of dropping of the workpiece, the image quality of the captured image, and the accuracy of the image processing.

DESCRIPTION OF EMBODIMENTS

Figure 1:
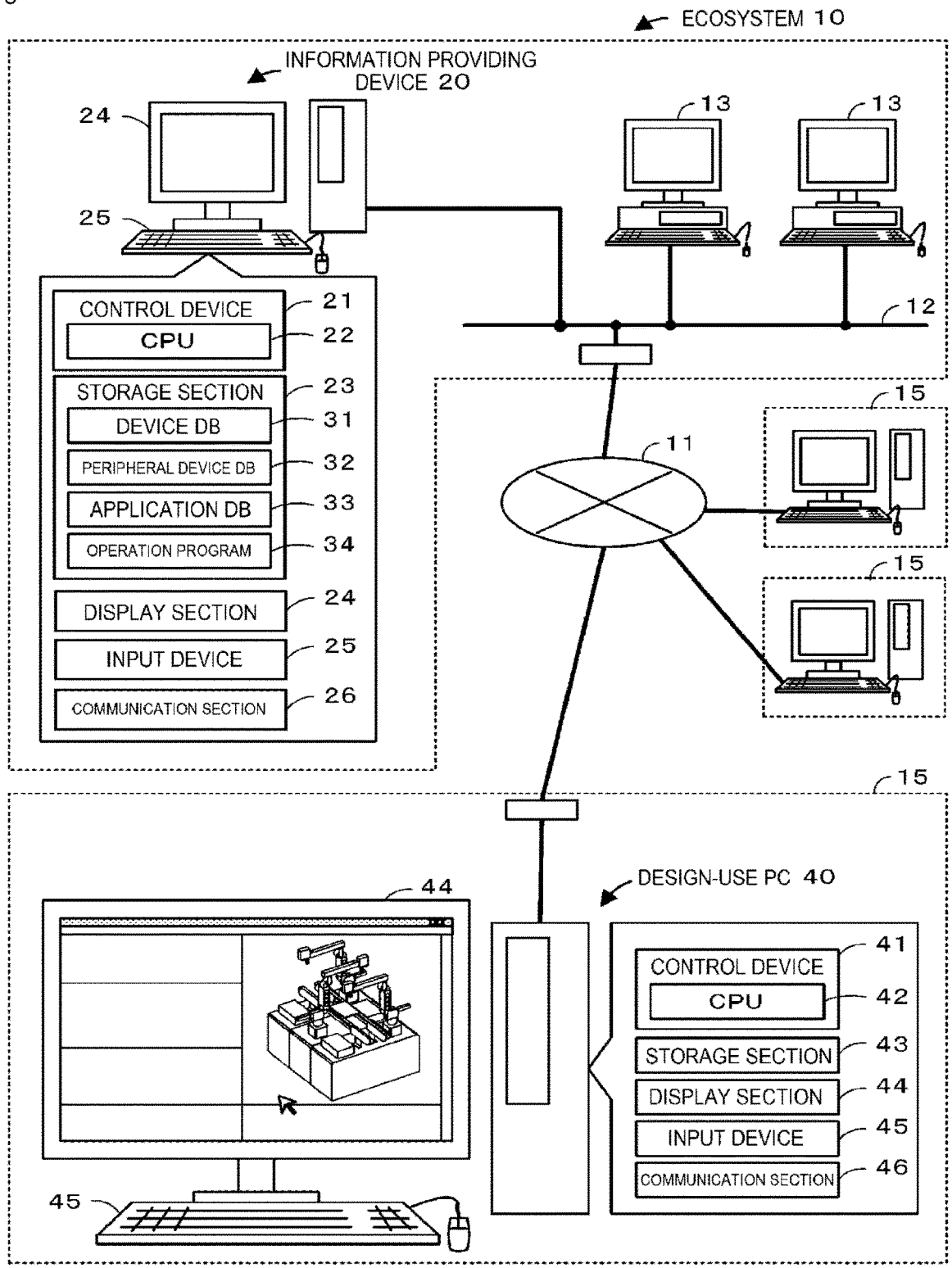
FIG. 1 is a schematic explanatory view illustrating an example of an ecosystem 10.
Figure 2:
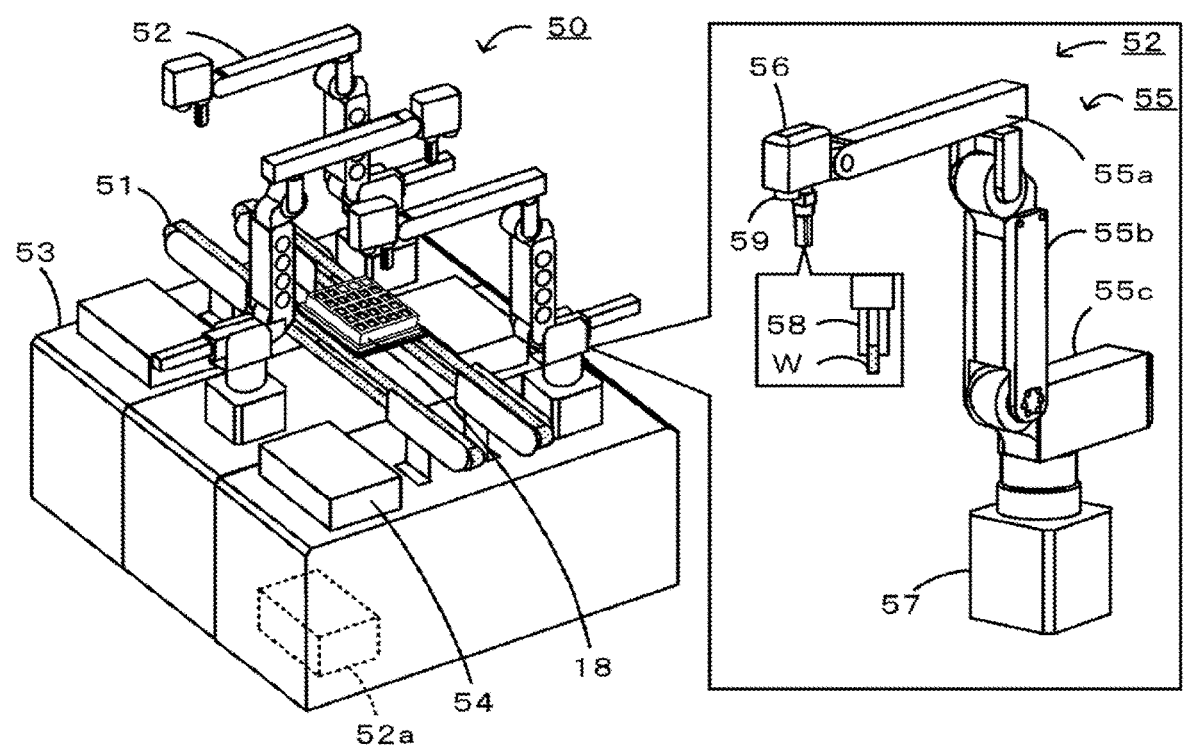
FIG. 2 is a perspective view illustrating an example of a work system 50.
Figure 3:
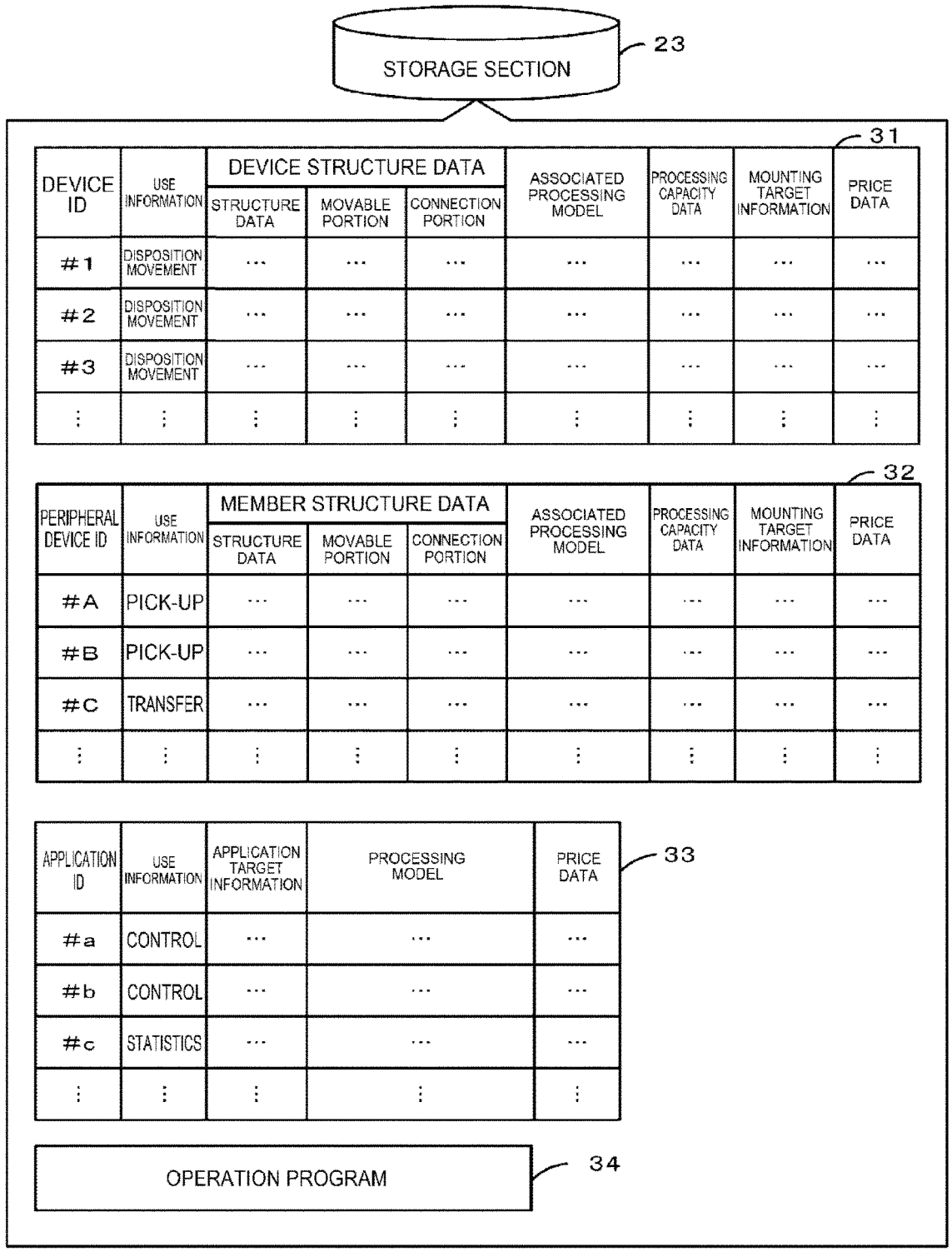
FIG. 3 is an explanatory view of information stored in a storage section 23.

Preferred embodiments of an information providing device 20 disclosed in the present specification will be described below with reference to the drawings. FIG. 1 is a schematic explanatory view of an ecosystem 10 including the information providing device 20. FIG. 2 is a perspective view illustrating an example of a work system 50 that performs predetermined processing on a workpiece W. FIG. 3 is an explanatory view of a device database (DB) 31, a peripheral device DB 32, and an application DB 33 stored in a storage section 23. As illustrated in FIG. 1, ecosystem 10 includes multiple designed personal computers (PCs) 13 connected to LAN 12, and information providing device 20 connected to LAN 12. Design-use PC 13 is a computer for designing structures incorporated in work system 50 illustrated in FIG. 2, for example, arrangement device 52 as a work robot or a peripheral device mounted around the robot.

The information providing device 20 is configured as a server that handles information on a work system including a work robot that performs a predetermined work on the workpiece W. Information providing device 20 receives an order of work system 50 or receives an order of a peripheral device mounted on arrangement device 52. Information providing device 20 transmits data to shop PC 40 (information processing device) through network 11 such as the Internet or receives information from shop PC 40. Information providing device 20 includes control device 21 for controlling the entire device, storage section 23 for storing various application programs and various data files, display section 24 for displaying various information, input device 25 such as a keyboard and a mouse for inputting various commands by an operator, and communication section 26 for communicating with external devices such as design-use PC 13. The control device 21 is configured as a microprocessor centered on a CPU 22. The communication section 26 is a network interface for communicating with an external device.

Here, the work system 50 will be described. As illustrated in FIG. 2, the work system 50 includes the arrangement device 52 as a work robot that performs a predetermined processing on a processing target object (workpiece W). The work system 50 includes a conveyance device 51 for conveying a disposing member 18 such as a pallet for arranging the workpiece W, at least one arrangement devices 52, a supply device 54 for supplying the workpiece W, and a control device 52a for controlling the device. Here, an example in which the work system 50 performs the operation of moving the workpiece W from a supply position to the disposing member 18 will be described. The workpiece W as a work target is not particularly limited, and examples thereof include various components such as mechanical components, electric components, electronic components, chemical components, and the like, as well as food, bio- and biological-related articles, and the like. The predetermined work includes, for example, a moving work of picking, moving, and disposing from a supply position to a destination, an assembling work of assembling components, a processing work of performing processing, an application work of applying a viscous material, a heating work of heating, a processing work of performing chemical and/or physical predetermined processing, and an inspection work of performing inspection. Arrangement device 52 is configured as an articulated arm robot, and includes base 53, arm member 55, end effector 56, and pedestal section 57. The base 53 is a rectangular parallelepiped member having a connecting section connected to an adjacent device (such as arrangement device 52), and is provided with the arm member 55, other devices (conveyance device 51 and supply device 54), and the like on the upper section thereof. The arm member 55 has first arm member 55a, second arm member 55b, and third support section 55c. End effector 56 is removably disposed at the tip end of arm member 55. On the lower face side of end effector 56, pickup member 58 that grips and picks up workpiece W and imaging device 59 that is used for recognizing a processing target are disposed. Pickup member 58 may be a suction nozzle for picking up workpiece W by negative pressure. With work system 50, it is possible to automate the processing work on workpiece W.

As illustrated in FIGS. 1 and 3, the storage section 23 of the information providing device 20 stores the device DB 31, the peripheral device DB 32, the application DB 33, an operation program 34, and the like. The device DB 31 is a data base including information on various devices handled by the information providing device 20. The device DB 31 includes device identification information (ID), use information on the device, device structure data including structure data such as an external shape of the device, information on a processing model associated with the device, processing capacity data including basic specifications of the device, mounting target information including information on items connectable to the device, price data relating to the price of the device, and the like. Work system 50 includes a device (main device) and a peripheral device as a structure. Examples of the main device include arrangement device 52 and base 53 as a work robot, and examples of the peripheral device include conveyance device 51, supply device 54, end effector 56, imaging device 59, and the like. The use of the device includes information that can roughly extract the functions of the device, and includes, for example, "disposition", "movement", "transfer", "fixation", "pick-up", "direction change", and the like. The device structure data includes structure data, movable portion data, connection portion data, and the like. The structure data is data for specifying the structure of each portion constituting the device by shape, size, material, and the like. The structure data may further include shape data, structure condition data, material data, and the like. The shape data may be, for example, three-dimensional CAD data. The structure condition data may include, for example, information such as strength, Young's modulus, weight, conductivity, and insulation of the structure. The material data may include, for example, information on a material that is configured, for example, information on a resin, a metal, a ceramic, or the like. For example, in the arrangement device 52, the structure data includes information such as the skeleton of the first arm member 55a, the skeleton of the second arm member 55b, the shape of the connecting member for connecting the two, the structure condition, the material, and the like. The movable portion data includes, for example, the information on the movable range and the position and direction of the rotation shaft of end effector 56, the rotation shaft of first arm member 55a, the rotation shaft of second arm member 55b, and the like, the information on the movable range and the position and direction of the rotation axis (vertical shaft) of third support section 55c, and the like. The movable portion data defines, for example, a movable range and a movable direction of the arm member 55. The connection portion data includes, for example, information such as a standard, a position, and a size of a fixing portion of pedestal section 57, a connection portion of end effector 56, a connection portion of pickup member 58, and a connection portion of imaging device 59. The connection portion data defines, for example, connectable arrangement device 52, pickup member 58 and imaging device 59 mountable to end effector 56, and the like. Information on the processing model includes, for example, at least one information on movement processing, pick-up processing, arrangement processing, direction conversion processing, incorporation processing, image capturing processing, and image processing, using the workpiece W. This processing model is defined in relation to the processing executed by the structure, and, for example, in the device, "transfer processing" is related to the conveyance device 51, and "movement processing, pick-up processing, and arrangement processing" is related to the arrangement device 52. Further, in the peripheral device, pickup member 58 is related to "pick-up processing", imaging device 59 is related to an "image capturing processing", and control device 52a is related to "image processing" or the like. Further, in each processing model, for example, the "image capturing processing" may include multiple processing concepts, such as still image imaging, moving image imaging, continuous imaging, and the like, and a processing condition and the like are set corresponding to each. The processing capacity data includes, for example, the size and mass of the workpiece W that can be processed, the operation speed and acceleration of the device, the pressure (pressurization, negative pressure) and load that can be applied to the workpiece, the usable current, voltage, amount of energy, and the like in the device. The mounting target information includes information on other devices connectable to the device and/or peripheral devices connectable to the device, for example, a device ID and a peripheral device ID. The mounting target information is set based on the connection portion data. The size, shape, movable range, processing content, and the like of the device are defined by the information included in the device DB 31.

The peripheral device DB 32 includes identification information (ID) of the peripheral device, use information on the peripheral device, member structure data including structure data such as an external shape of the peripheral device, information on processing model associated with the peripheral device, processing capacity data including basic specifications of the peripheral device, mounting target information including information on a device to which the peripheral device is connectable and/or other peripheral devices to which the peripheral device is connectable, price data on prices of the peripheral device, and the like. The information included in the peripheral device DB 32 is the same as the information included in the device DB 31 described above, and a detailed explanation of the information is omitted. The size, shape, movable range, processing content, and the like of the peripheral device are defined by the information included in the peripheral device DB 32. The application DB 33 is a data base containing information on control software (applications) including a processing model used in devices and peripheral devices. The application DB 33 includes, for example, identification information (ID) of an application, use information of the application, application target information including information on a device and/or a peripheral device that is usable by the application, information on a processing model associated with the application, price data on a price of the peripheral device, and the like. The application is used for a structure such as a specific device or a peripheral device, and is produced and sold together with or separately from the structure. Specific examples of such an application include the control content of image capturing processing used in specific imaging device 59. The application may be a traceability tool of a structure such as a device or a peripheral device used in the work system 50, an image processing data creation tool, an analysis tool, or the like. By applying the application included in application DB 33 to the structure, the control of the structure with respect to a specific workpiece W or the like is optimized.

The operation program 34 is a program for executing an operation of a work system (operation of structure) in a virtual space by using information on a structure and information on a processing model related to the structure. The operation program 34 is a so-called simulation program that operates the structure in the processing of the processing model. Operation program 34 acquires information included in device DB 31 and peripheral device DB 32, executes the operation, and displays and outputs the execution result as, for example, a moving image in a state in which the peripheral device is mounted on the device, a state in which the device and the device are connected, further in a combination thereof. At this time, operation program 34 applies the processing condition applied to the structure and the processing model to execute the processing of the processing model in the structure in the virtual space.

As illustrated in FIG. 1, shop PC 40 is disposed in shop 15 operated by a company or the like that runs ecosystem 10. Shop PC 40 provides information on work system 50 to customers and the like considering introducing work system 50. In shop 15, for example, an explainer who understands the technique of work system 50 is disposed, and shop PC 40 is operated by the explainer. Shop PC 40 is configured as an information processing device, and includes control device 41 including CPU 42 and the like, storage section 43, display section 44, input device 45, and communication section 46. The control device 41, the storage section 43, the display section 44, the input device 45, and the communication section 46 may be the same as those described for the information providing device 20. Shop PC 40 exchanges data with information providing device 20 through network 11 and communication section 46.

Figure 4:
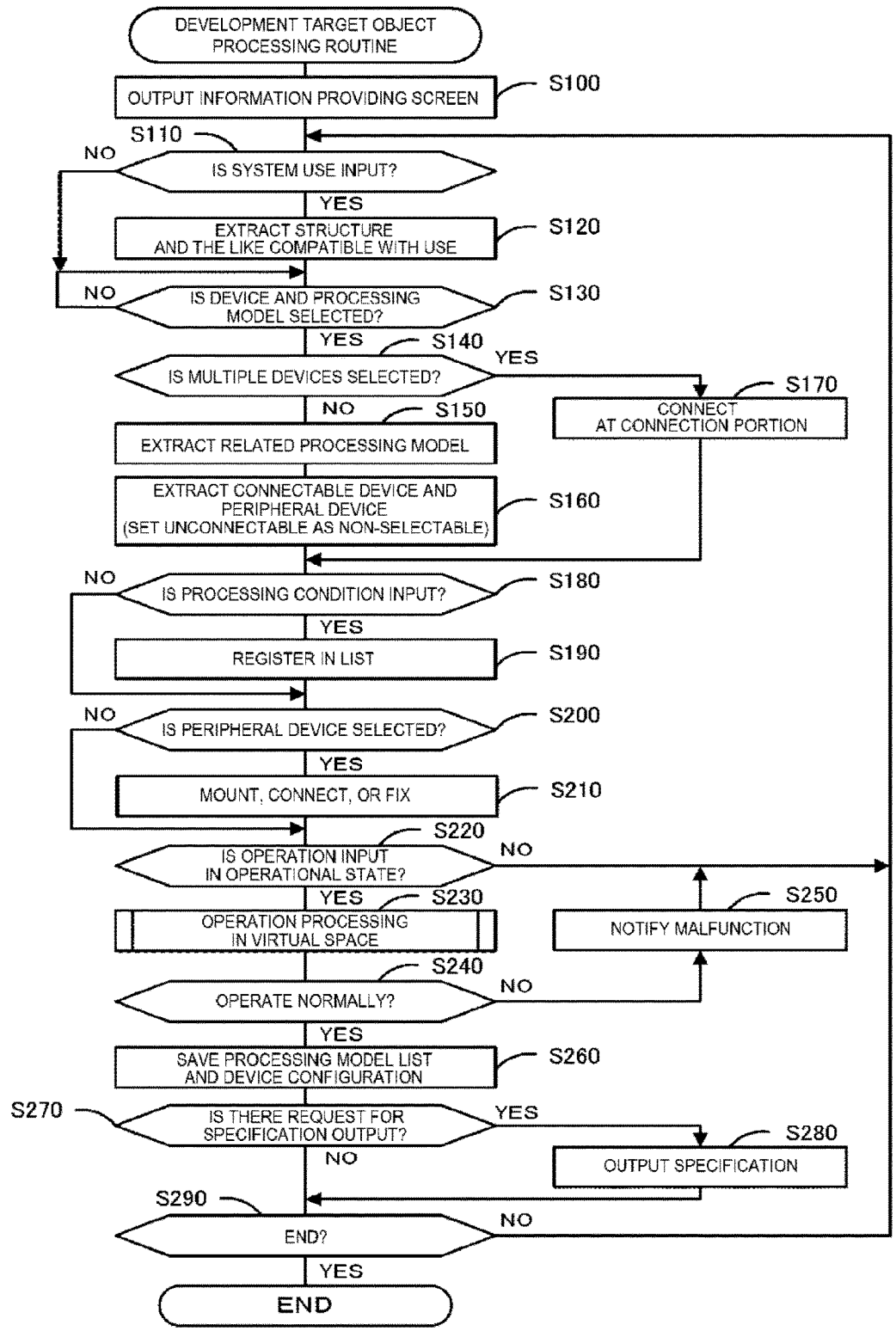
FIG. 4 is a flowchart illustrating an example of an information providing processing routine.

Next, the operation of ecosystem 10 of the present embodiment, in particular, the operation of providing information on the automation by the work robot to the customer will be described. Here, the processing executed by information providing device 20 based on the information acquired from shop PC 40 will be mainly described. The processing performed when information providing device 20 constructs work system 50 (see FIG. 2) will be described as a specific example. FIG. 4 is a flowchart illustrating an example of an information providing processing routine executed by CPU 22 of information providing device 20. This routine is stored in storage section 23 and executed in response to a start instruction from the operator (explainer) of shop 15. When this routine is started, CPU 22 of control device 21 outputs information providing screen 60 to shop PC 40 (step S100).

Figure 5:
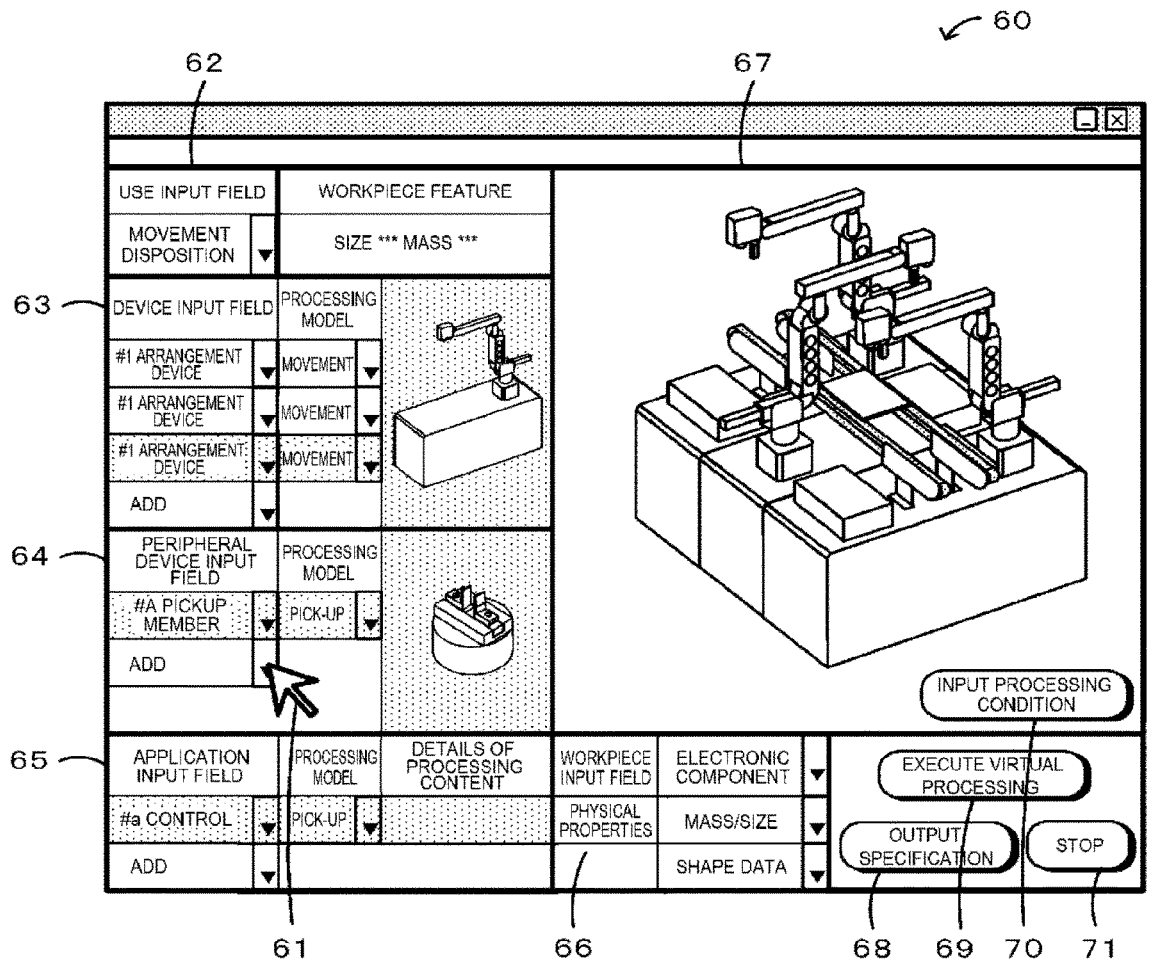
FIG. 5 is an explanatory view of information providing screen 60.

FIG. 5 is an explanatory view illustrating an example of information providing screen 60 displayed on display section 44 of shop PC 40. In information providing screen 60, cursor 61, use input field 62, device input field 63, peripheral device input field 64, application input field 65, workpiece input field 66, image display field 67, and the like are disposed. Cursor 61 is for an operator to select and input an input field disposed on the screen, and moves on the screen by operation of input device 45. Use input field 62 is a field for inputting information that specifies the use of the system to be constructed. When a use is input in use input field 62, a device or peripheral device compatible with the use is preferentially displayed based on device DB 31 or peripheral device DB 32. In use input field 62 and other input fields, the selection items are displayed by a pull-down menu. In information providing screen 60, when a specific item is input, the number of selection items increases, decreases, or changes in accordance with the input of the specific item. For example, when a device is specified, other devices that are connectable to the device are selectively displayed and non-connectable devices are non-selectable. When the size or mass of a workpiece is input, a device or a peripheral device which cannot handle the workpiece cannot be selected. The non-selectable mode may be, for example, deleted from the selection item or displayed in a non-selectable mode. Such display control is performed based on information output from the information providing device 20, and may be executed by the control device 21 or the control device 41. Device input field 63 is a field for selecting and inputting a desired device. In device input field 63, when a device is selected, a processing model associated with the device can be displayed, and an image of the device is displayed in a region adjacent to the input field. Peripheral device input field 64 is a field for inputting a peripheral device mounted on the device. Also in peripheral device input field 64, when a peripheral device is selected, a processing model associated with the peripheral device can be displayed, and an image of the peripheral device is displayed in a region adjacent to the input field. Application input field 65 is a field for selecting and inputting an application to be applied to a structure such as a device and a peripheral device. In application input field 65, when an application is selected, a processing model associated with the application can be displayed, and details of the processing content are displayed in a region adjacent to the input field. Workpiece input field 66 is a field for inputting information on a workpiece to be handled, and, for example, the type of the workpiece, physical properties such as mechanical strength, mass, size, shape, and the like can be input. Image display field 67 is a field to be displayed in a state in which the selected device or peripheral device is connected and mounted. In image display field 67, an image and a moving image of work system 50 is displayed. Further, specification output key 68, virtual processing execution key 69, processing condition input key 70, and stop key 71 are disposed on information providing screen 60. Specification output key 68 is a key that is pressed (clicked) when the specification is output. Virtual processing execution key 69 is a key pressed when displaying the operation of work system 50 by operation program 34 on image display field 67. Processing condition input key 70 is a key that is pressed when inputting a processing condition to be executed by operation program 34. Stop key 71 is a key that is pressed when the current processing is stopped. When processing condition input key 70 is pressed, CPU 22 displays processing condition input screen 72 on display section 44.

Figure 6:
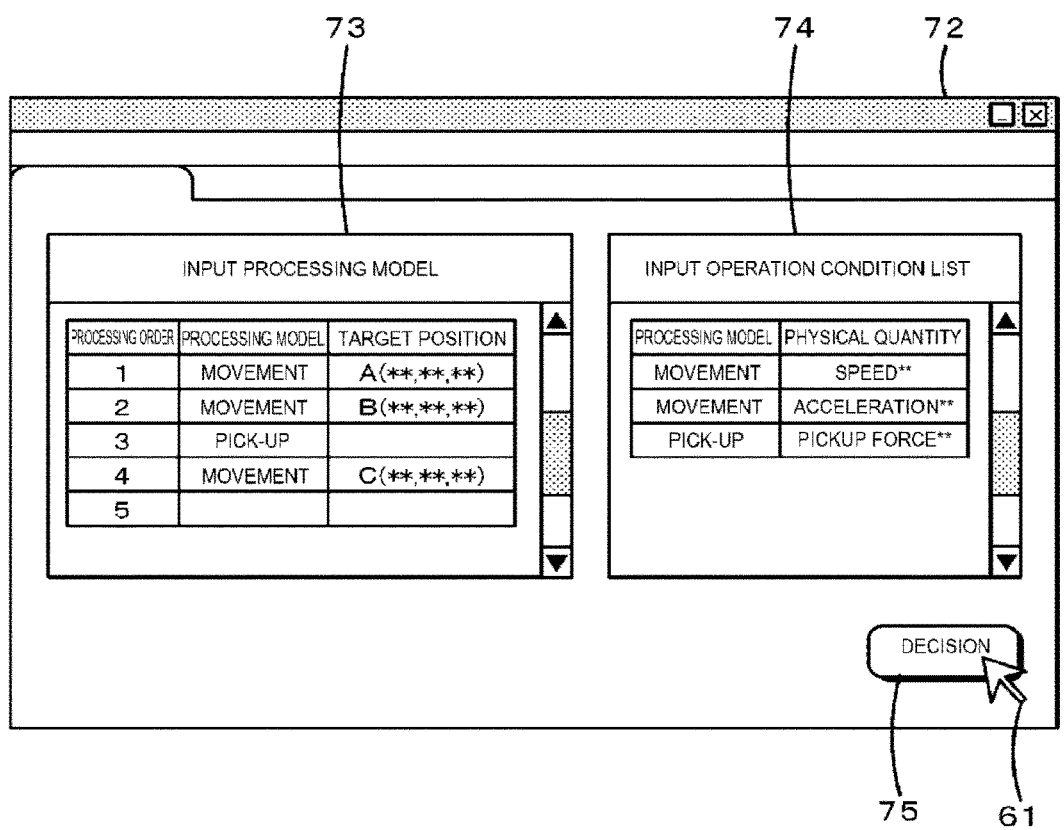
FIG. 6 is an explanatory view of processing condition input screen 72.

FIG. 6 is an explanatory view of processing condition input screen 72 displayed on display section 44 of shop PC 40. Processing condition input screen 72 is superimposed and displayed on information providing screen 60 when processing condition input key 70 is pressed. Processing condition input screen 72, processing list input field 73, operation condition list input field 74 and decision key 75 are disposed. Processing list input field 73 is a field for inputting a processing model processed by work system 50 as a command in a list format. Processing list input field 73 includes an input field of the processing model and an input field of the target coordinates in the movement processing. The processing list is executed by operation program 34, and after work system 50 is manufactured, it is configured to be available as an execution job in work system 50 as well. The list illustrated in FIG. 6 defines processing of moving pickup member 58 to the A position, then to the B position (pick-up position) lower than the A position, performing the pick-up processing there, and moving to the C position higher than the B position. Operation condition list input field 74 is a field for inputting the operating conditions of the processing model and can input, for example, speed and acceleration in the movement processing, gripping force and suction force when picking up workpiece W, and the like. Decision key 75 is a key that is pressed when the input to processing list input field 73 and operation condition list input field 74 is completed. The operator performs various necessary inputs to information providing screen 60 and processing condition input screen 72.

After S100, CPU 22 determines whether the use of the system has been input based on the input content in use input field 62 (S110). When a system use is input, CPU 22 extracts a structure, processing model, and application compatible with the input use (S120). CPU 22 extracts a structure, processing model, and application by using device DB 31, peripheral device DB 32, and application DB 33. CPU 22 uses the extracted information for display control of information providing screen 60. After S120 or when there is no input in S110, CPU 22 determines whether the device and the processing model related to the structure have been selected based on whether the selection information has been acquired from shop PC 40 (S130) and waits as is when the device and processing model has not been selected. Shop PC 40 transmits the input content of device input field 63 to information providing device 20 as selection information. On the other hand, when a device is selected in S130, CPU 22 determines whether multiple devices have been selected (S140). When multiple devices are not selected, that is, when one device is selected, CPU 22 extracts processing models related to the device (S150), and extracts other devices and peripheral devices that can be connected to the selected device (S160). At this time, CPU 22 sets devices and peripheral devices that cannot be connected to non-selectable. On the other hand, when multiple devices are selected in S140, the previously selected devices are connected at a connection portion or the like (S170). Although illustration of the processing is omitted, CPU 22 may determine whether an application is selected, and when the application is selected, the application may be applied to the device or the peripheral member.

After S160 or S170, CPU 22 determines whether processing condition input key 70 is pressed and whether the processing condition is input in processing condition input screen 72 based on whether the processing condition information including the processing condition is acquired from shop PC 40 (S180), and when the processing condition is input, the content is registered in the processing list (S190). After S190 or when the processing condition is not input in S180, CPU 22 determines whether the peripheral device is selected based on the input content of peripheral device input field 64 (S200), and when the peripheral device is selected, CPU 22 mounts, connects, or fixes the peripheral device to the connection portion such as the device (S210). Although the graphical representation of the processing is omitted, CPU 22 determines whether the application is selected and, when the application is selected, the application may be applied to a device or a peripheral device.

After S210 or when no peripheral device has been selected in S200, CPU 22 determines whether the currently constructed work system 50 is in an operational state, that is, whether the various data described above has been selected or input correctly (S220). For example, CPU 22 determines that work system 50 is not operable when there is a fault, such as when the operation condition is not input or when the peripheral device for executing the processing is not selected. When it is determined that work system 50 is not operable, virtual processing execution key 69 may be set to a non-selectable state (for example, gray display) so that it cannot be pressed. Further, CPU 22 determines S220 based on whether virtual processing execution key 69 is pressed when work system 50 is in an operational state. When a negative determination is made in S220, for example, when work system 50 is not operational or when work system 50 is operational but can be changed, CPU 22 executes processing from S110. That is, when the operation processing of work system 50 cannot be executed in the virtual space, the operator corrects work system 50 that is currently constructed. In addition, CPU 22 connects a new device when it is selected, connects a new peripheral device when it is selected, and registers a processing condition when it is input in the processing list.

Figure 7A:
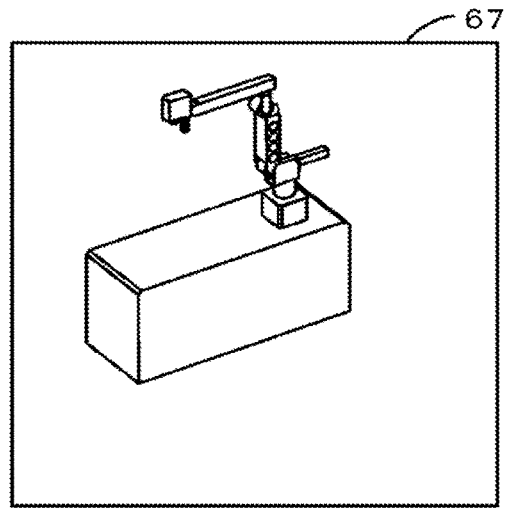
FIG. 7 is an explanatory view of image display field 67 in the course of configuring the system.
Figure 7B:
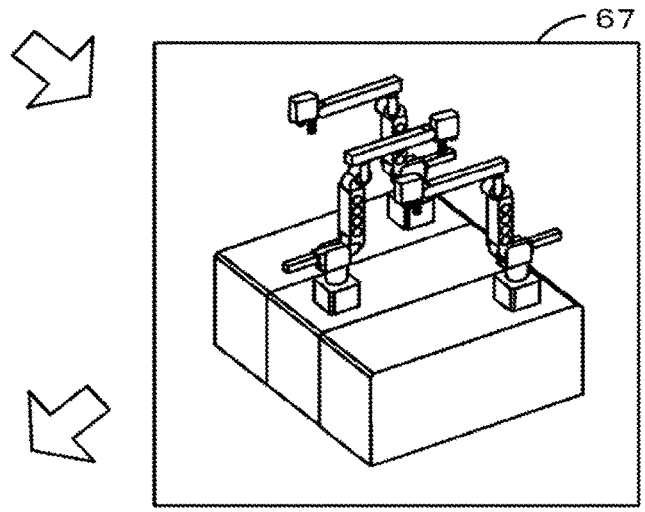
Figure 7C:
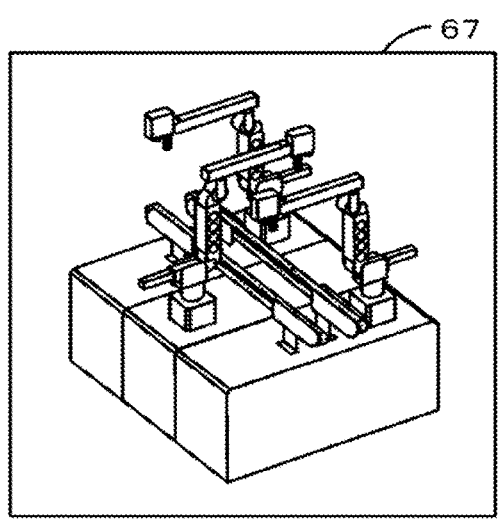
Figure 7D:
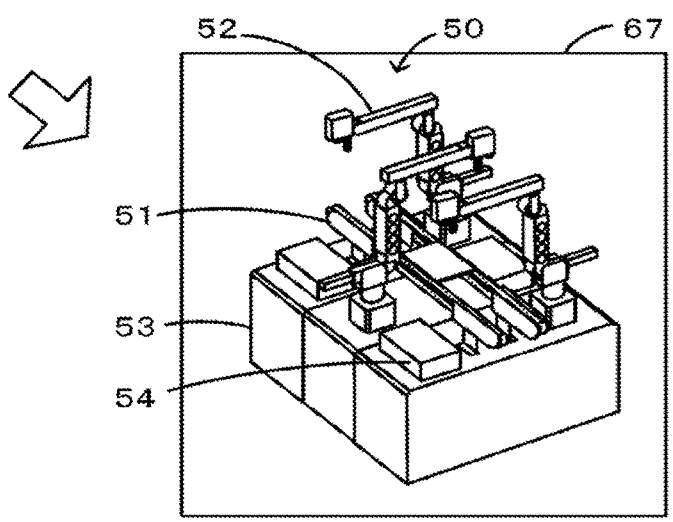

FIG. 7 is an explanatory view of image display field 67 in the processing of constructing the system, FIG. 7A is a view in which arrangement device 52 is selected, FIG. 7B is a view in which multiple arrangement devices 52 are connected, FIG. 7C is a view in which conveyance device 51 is selected, and FIG. 7D is a view in which supply device 54 is disposed to construct work system 50. When the operator selects a device, the selection content is reflected in image display field 67. Further, since storage section 43 stores the information on the connection portion of each device, CPU 22 uses this information, and displays the device in the state where the connection portions are connected to image display field 67. At this time, since a structure that can be connected at a connection portion is selectively displayed on information providing screen 60, the operator can easily select the device.

Now, when the operation is input while the device is in an operable state in S220, CPU 22 executes the operation processing of work system 50 in the virtual space (S230). CPU 22 operates work system 50 in the virtual space by applying the registered processing conditions in the selected structure and a processing model related to the selected structure, and outputs the operation result as a moving image to image display field 67. At this time, CPU 22 performs calculations including whether dropping of the workpiece piece W or deviation of the gripping position occurs during movement in accordance with the gripping force or the mass of workpiece W, and the like, when workpiece W is moved at the speed or acceleration of the set processing condition. CPU 22 also calculates whether the structure interferes (comes into contact) with other structures when the device is operated. In addition, CPU 22 calculates, for example, how long it takes to execute a set processing list when it executes the set processing list. After S230, CPU 22 determines whether work system 50 has operated normally based on the calculation result (S240). That is, CPU 22 determines whether a predetermined work to be executed by work system 50 has been performed normally in the virtual space. When the operation is not executed normally, CPU 22 notifies the operator of its malfunction (S250), and executes processing from S110. The operator who has checked the malfunction corrects the currently constructed work system 50 by, for example, changing the device in S130 or changing the peripheral device in S200.

Figure 8A:
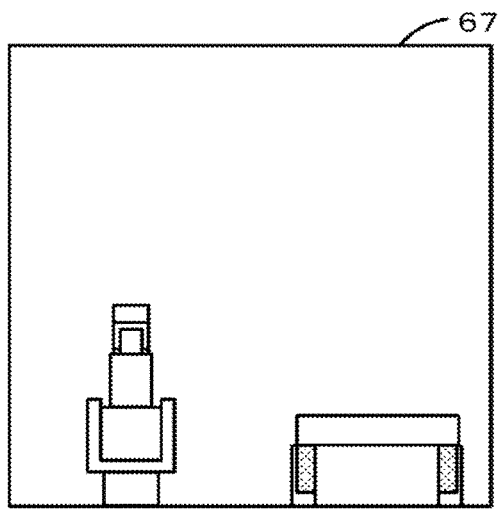
FIG. 8 is an explanatory view illustrating an abnormal operation of work system 50 in a virtual space.
Figure 8B:
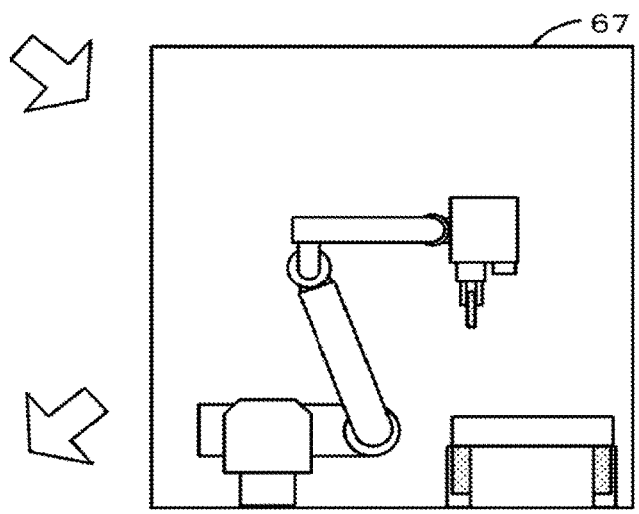
Figure 8C:
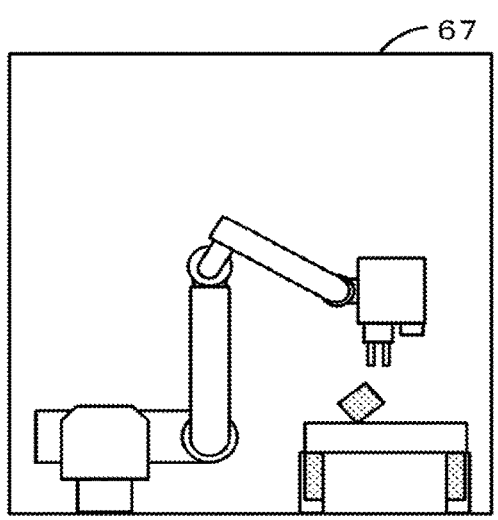
Figure 9A:
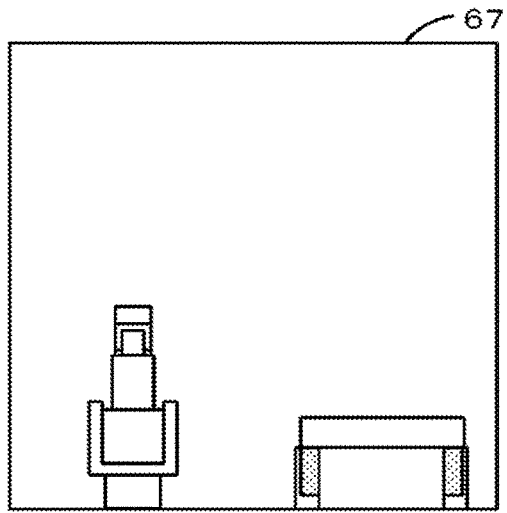
FIG. 9 is an explanatory view illustrating a normal operation of work system 50 in the virtual space.
Figure 9B:
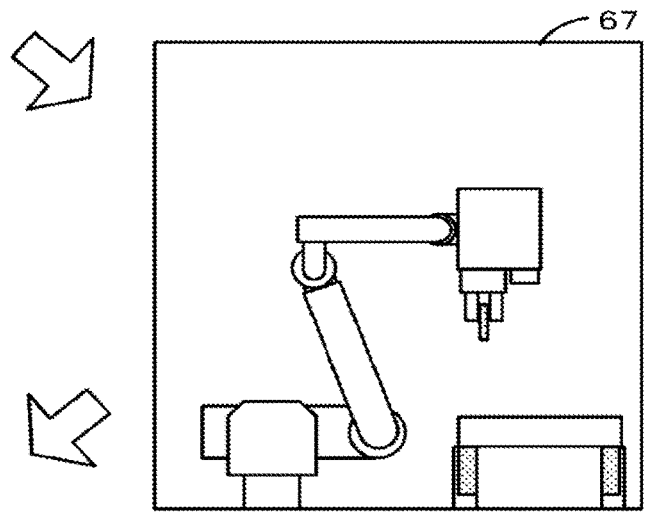
Figure 9C:
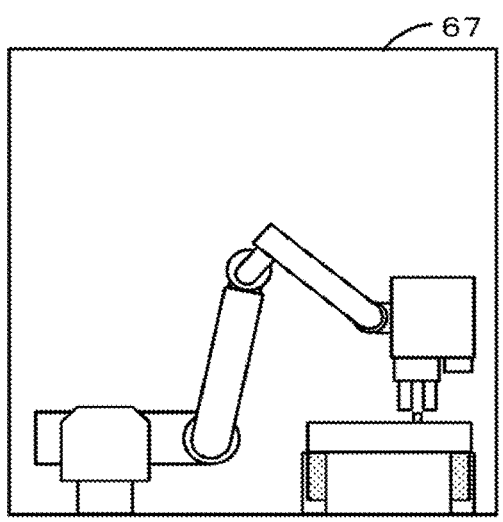

FIG. 8 is an explanatory view illustrating an abnormal operation of work system 50 in the virtual space, FIG. 8A is a view of picking up workpiece W, FIG. 8B is a view of moving workpiece W, and FIG. 8C is a view of disposing workpiece W. FIG. 9 is an explanatory view illustrating the normal operation of work system 50 in the virtual space, FIG. 9A is a view of picking up workpiece W, FIG. 9B is a view of moving workpiece W, and FIG. 9C is a view of disposing workpiece W. As illustrated in FIG. 8, when arrangement device 52 moves workpiece W, workpiece W may fall from pickup member 58 when the gripping force is insufficient. The operator who checked this replaces pickup member 58 having a high gripping force and operates the processing again. As illustrated in FIG. 9, it can be checked that when pickup member 58 having a high gripping force is used, the pick-up, movement, and arrangement processing of workpiece W are normally operated. Further, in ecosystem 10, even when it is checked that work system 50 can operate normally, for example, it is possible to examine the total processing time, and it is possible to verify the optimum device environment without preparing an actual machine. Further, in the operation check of work system 50 in the virtual space, for example, it is possible to consider a work at the time of switching the product type to assumed other workpiece W, and it is possible to verify a result of changing disposing member 18 for arranging the workpieces. Furthermore, in ecosystem 10, for example, by performing the operation check of work system 50 in the virtual space in a state in which an application for optimizing the supply conditions of workpiece W of supply device 54 is incorporated, it is possible to verify the effect of efficiency improvement such as shortening the processing time.

On the other hand, when the work system operates normally in S240, the device configuration of the currently registered processing list and work system 50 are saved (S260). Next, CPU 22 determines whether an output request of the design specification has been input based on whether specification output key 68 of the design specification has been pressed (S270). When the output request of the design specification is input, CPU 22 causes shop PC 40 to output the design specification information including the information on the design specification based on the configuration of work system 50 saved in S260 (S280). Shop PC 40 may print out the design specification included in the design specification information. CPU 22 determines whether the end of information provision has been input based on the input on information providing screen 60 (S290), and when the end is not input, CPU 22 executes processing from S110. On the other hand, this routine ends when the end of information provision is input in S290. When work system 50 is ordered after the output of the design specifications, CPU 22 may output the saved processing list to the manufacturing work system 50 as an execution job.

Here, the correspondence relationship between the constituent elements of the present embodiment and the constituent elements of the present disclosure will be clarified. Storage section 23 of the present embodiment corresponds to the storage section of the present disclosure, CPU 22 corresponds to the control section, and arrangement device 52 corresponds to the work robot. In the present embodiment, an example of the control method of the present disclosure is also clarified by describing the operation of information providing device 20.

In information providing device 20 of the present embodiment described above, information on two or more structures related to the work robot and information on one or more processing models related to the structures are registered. Information providing device 20 has operation program 34 for executing the operation of the work system in the virtual space by using the information on the structure and the information on the processing model related to the structure. Information providing device 20 acquires selection information in which the information on the two or more structures and the processing model related to the structures are selected, reads the information on the structures and the information on the processing model included in the selection information, executes, by an operation program, processing of the processing model in a virtual space in a state in which the two or more structures are connected, and outputs the executed processing result. The operator who is the customer or the manufacturer can check how the processing is executed in the virtual space when multiple structures are combined based on the output processing result without actually constructing the work system. Therefore, in information providing device 20, the construction of the work system can be more easily executed.

In addition, control device 21 constructs a work system obtained by combining the selected structure and the processing model in the virtual space, causes the constructed work system to operate in the virtual space by the operation program, determines whether the operation by the work system has been normally executed, and outputs the determination result. In information providing device 20, the construction of work system 50 can be more easily executed by using the determination result of whether work system 50 is normally executed in the virtual space. When the operation of work system 50 in the virtual space is normally performed, control device 21 outputs the design specification information of work system 50 based on the information on the structure and the information on the processing model. In information providing device 20, since work system 50 can be constructed when work system 50 in the virtual space can operate correctly, the design specification can be automatically created as it is. Further, control device 21 may output the design specification information based on the information on the structure of the processing result and the information on the processing model when the specification output information is acquired after outputting the processing result. In information providing device 20, when it is checked that work system 50 in the virtual space is in accordance with the intention of the customer, the design specification can be automatically created as it is because the information necessary for constructing work system 50 is prepared.

Further, in information providing device 20, the information on the structure includes information on the connection portion connected to another structure, and after acquiring the selection information, control device 21 outputs information on the other structure which can be connected to the structure based on the information on the connection portion. In information providing device 20, a connectable structure can be easily selected. In addition, control device 21 makes it impossible to select another structure that is not connectable, so that it is easy to select a connectable structure. Further, control device 21 acquires processing condition information including the processing condition to be applied to the structure and the processing model, and executes processing of the processing model in the virtual space in a state in which the acquired processing condition is applied and the two or more structures are connected. In information providing device 20, since the processing based on the processing condition is executed in the virtual space, it is possible to check various processing states such as changing the processing condition. Further, work system 50 executes the actual processing by directly applying the processing list which lists the information on the processing model. Control device 21 outputs a list of processing models of the processing result as an execution job for incorporating into the work system 50 when order information is acquired after outputting the processing result. In information providing device 20, since the processing model checked in the virtual space can be incorporated into the actual work system 50 as it is, and it is not necessary to newly create a program for controlling work system 50, the construction of work system 50 can be more easily executed.

In addition, since the structure includes at least one of a work robot, a supply device, a conveyance device, an imaging device, an end effector, and portions thereof, information providing device 20 can check the processing state and the like of each of the above-mentioned structures in the virtual space. Further, since the information on the structure includes at least one of shape data, structure condition data, and material data, in information providing device 20, by defining the shape, structure condition, and material, the structure corresponding to the content of the data can be executed in the virtual space. Furthermore, since the processing model includes at least one of movement processing, pick-up processing, arrangement processing, direction conversion processing, incorporation processing, image capturing processing, and image processing using workpiece W, information providing device 20 can check these processing in the virtual space.

It is to be understood that the present disclosure is not limited to the embodiments described above in any way, and may be executed in various forms as long as the embodiments belong to the technical scope of the present disclosure.

For example, in the embodiment described above, control device 21 executes the operation of work system 50 in the virtual space by operation program 34, outputs the processing result as a moving image, and outputs the determination result of whether the processing has been normally executed. However, the processing result may be output only as a moving image, or only the determination result may be output. With any of these information providing devices, the construction of the work system can be performed more easily.

In the embodiment described above, information providing device 20 outputs the design specification information when the specification output information is acquired from shop PC 40 after outputting the processing results of operation program 34, but this may be omitted. In the embodiment described above, when the operation of work system 50 in the virtual space is normally performed, the design specification information of work system 50 is output based on the information on the structure and the information on the processing model, but the output of the design specification information may be omitted. With any of these information providing devices, the construction of the work system can be performed more easily.

In the embodiment described above, control device 21 acquires the structure selection information and then outputs another structure that can be connected to the structure in a selectable manner based on the information on the connection portion, but the present disclosure is not particularly limited thereto, and this processing may be omitted. In the embodiment described above, the structure that is not connectable is set to the non-selectable state, but this processing may be omitted. Whenever control device 21 acquires the selection information from shop PC 40, control device 21 may determine whether the newly selected structure can be connected to the selected structure.

In the embodiment described above, work system 50 can execute actual processing by directly applying the processing list executed by operation program 34, but the present disclosure is not particularly limited thereto, and work system 50 may execute a newly created execution job separately from the processing list of operation program 34. This information providing device also makes it easier to construct a work system. It is preferable to construct the processing list so as to be executable by operation program 34 and workpiece work system 50 because it is easier to construct the work system.

In the embodiment described above, the present disclosure has been described as information providing device 20 that executes the operation processing by operation program 34, but the present disclosure is not particularly limited to this, and the present disclosure may be an information providing method or an information providing program. In particular, the present disclosure may be executed not only as information providing device 20 but also on a cloud. In the above-described embodiment, it is assumed that CPU 22 of information providing device 20 executes the operation program to execute the processing by the operation program in the virtual space. However, the present disclosure is not limited thereto, and the processing by the structure may be executed in the virtual space by CPU 42 of shop PC 40 executing the operation program. For example, shop PC 40 may function as an information providing device.

Here, in the information providing device of the present disclosure, the control section may construct the work system obtained by combining the selected structures and processing model in the virtual space, cause the constructed work system to operate in the virtual space by the operation program, determine whether the operation by the work system has been normally executed, and output a determination result. In this information providing device, the construction of the work system can be more easily executed by using the determination result of whether the work system is normally executed in the virtual space.

Alternatively, the information providing device of the present disclosure may be an information providing device used in a work system including a work robot for performing a predetermined work on a workpiece, the information providing device may include: a storage section configured to register and store information on two or more structures related to the work robot and information on one or more processing models related to the structures; an operation program configured to execute an operation of the work system in a virtual space by using information on the structures and information on a processing model related to the structures; and a control section configured to acquire selection information in which the information on the two or more structures and the processing model related to the structures stored in the storage section are selected, construct the work system obtained by combining the selected structures and processing model in the virtual space, causing the constructed work system to operate in the virtual space by the operation program, determine whether the operation by the work system has been normally executed, and output a determination result.

The information providing device acquires selection information in which the information on the two or more structures and the processing model related to the structures are selected, constructs a work system obtained by combining the selected structures and the processing model in a virtual space, causes the constructed work system to operate in the virtual space by an operation program, and outputs a determination result as to whether the operation by the work system has been normally executed. In this information providing device, the construction of the work system can be more easily executed by using the determination result of whether the work system is normally executed in the virtual space.

In the information providing device according to the present disclosure in the aspect of determining the operation by the work system, when the operation of the work system in the virtual space is normally performed, the control section may output design specification information of the work system based on the information on the structures and the information on the processing model. In this information providing device, since the work system can be constructed when the work system in the virtual space can operate correctly, the design specification information can be automatically created as it is.

In the information providing device of the present disclosure, the control section may output design specification information based on the information on the structures and the information on the processing model of the processing result when specification output information is acquired after outputting the processing result. In this information providing device, when it is checked that the work system in the virtual space is in accordance with the intention of the customer, the design specification information can be automatically created as it is because the information necessary for constructing the work system is prepared.

In the information providing device of the present disclosure, information on a connection portion connected to another structure may be included in the information on the structures, and the control section may output information on another structure connectable to the structures based on the information on the connection portion after acquiring the selection information. In this information providing device, it is easy to select the structure that can be connected. In the information providing device, when outputting information on the connectable other structure, the control section may select another connectable structure. When outputting information on the connectable other structures, the control section may disable selection of other structures that are not connectable. Alternatively, the control section may selectively output the structure connectable to the selected structure based on the information on the connection portion after one of the structures is selected. In this information providing device, it is easy to select the structure that can be connected.

In the information providing device of the present disclosure, the control section may acquire processing condition information including a processing condition to be applied to the structures and the processing model, and execute processing of the processing model in a virtual space in a state in which the acquired processing condition is applied and the two or more structures are connected. In this information providing device, processing based on processing conditions is executed in a virtual space, and various processing states can be checked by changing processing conditions, and the like. Here, the "processing condition" include, for example, physical quantities used in processing, and specifically, size, mass, speed, acceleration, pressure, current, voltage, energy, time, and the like.

In the information providing device of the present disclosure, the work system may execute actual processing by applying the information on the processing model as it is, and the control section may output a list of the processing models of the processing result as an execution job for incorporating into the work system when order information is acquired after outputting the processing result. In this information providing device, it is possible to incorporate the processing model checked in the virtual space into the actual work system as it is, and it is not necessary to newly create a program for controlling the work system, so that the construction of the work system can be more easily executed.

In the information providing device of the present disclosure, the structures may include at least one of a work robot, a supply device, a conveyance device, an imaging device, an end effector for executing processing on the workpiece, and a portion thereof. In this information providing device, the processing state and the like of each of the structures can be checked in the virtual space.

In the information providing device of the present disclosure, the information on the structures may include at least one of shape data, structure condition data, and material data. In this information providing device, by defining a shape, a structure condition, and a material, a structure in accordance with the content of the data can be executed in a virtual space.

In the information providing device of the present disclosure, the processing model may include at least one of movement processing, pick-up processing, arrangement processing, direction conversion processing, incorporation processing, image capturing processing, and image processing using the workpiece. In this information providing device, these processing can be checked in the virtual space.

The information providing method of the present disclosure is an information providing method used in a work system including a work robot that performs a predetermined work on a workpiece, in which an operation program that has information on two or more structures related to the work robot and information on one or more processing models related to the structures registered therein and executes an operation of the work system in a virtual space by using the information on the structures and the information on the processing model related to the structures exists, the method includes: (a) a step of acquiring selection information in which the two or more structures and the processing model related to the structures are selected; (b) a step of reading the information on the structures and the information on the processing model included in the selection information, and executing processing of the processing model in a state in which the two or more structures are connected by the operation program in the virtual space; and (c) a step of outputting an executed processing result.

In this information providing method, similarly to the above-described information providing device, an operator who is a customer or a manufacturer can check how the processing is executed in the virtual space when multiple structures are combined based on the output processing result without actually constructing a work system. Therefore, in this information providing device, the construction of the work system can be more easily executed. In this information providing method, the above-mentioned aspect of the information providing device may be adopted, or the above-mentioned step of expressing the function of the information providing device may be included.

Alternatively, the information providing method of the present disclosure may be an information providing method used in a work system including a work robot that performs a predetermined work on a workpiece, in which an operation program that has information on two or more structures related to the work robot and information on one or more processing models related to the structures registered therein and executes an operation of the work system in a virtual space by using the information on the structures and the information on the processing model related to the structures exists, the method may include: (a) a step of acquiring selection information in which the two or more structures and the processing model related to the structures are selected; (b) a step of constructing the work system obtained by combining the selected structures and processing model in the virtual space, (c) a step of causing the constructed work system to operate in the virtual space by the operation program to determine whether the operation by the work system has been normally executed, and (d) a step of outputting a determined result.

In this information providing method, similarly to the information providing device described above, the construction of the work system can be more easily executed by using the determination result of whether the work system is normally executed in the virtual space. In this information providing method, the above-mentioned aspect of the information providing device may be adopted, or the above-mentioned step of expressing the function of the information providing device may be included.

The program of the present disclosure is a program for causing one or more computers to execute each step of the information providing method described above. The program may be recorded on a computer-readable recording medium (such as hard disk, ROM, FD, CD, DVD), transmitted from one computer to another through a transmission medium (communication network such as the Internet or a LAN), or exchanged in any other manner. When the program is executed by one computer or by multiple computers share each step and execute, since each step of the information providing method described above is executed, so that the same operation and effect as those of the method can be obtained.

INDUSTRIAL APPLICABILITY

The information providing device, the information providing method, and the program disclosed in the present specification can be used in the technical field of a device that executes a predetermined work on a workpiece.

REFERENCE SIGNS LIST 10 ecosystem; 11 network; 12 LAN; 13 design-use PC; 15 shop; 18 disposing member; 20 information providing device; 21 control device; 22 CPU; 23 storage section; 24 display section; 25 input device; 26 communication section; 31 device DB; 32 peripheral device DB; 33 application DB; 34 operation program; 40 shop PC; 41 control device; 42 CPU; 43 storage section; 44 display section; 45 input device; 46 communication section; 50 work system; 51 conveyance device; 52 arrangement device; 52a control device; 53 base; 54 supply device; 55 arm member; 55a first arm member; 55b second arm member; 55c third support section; 56 end effector; 57 pedestal section; 58 pickup member; imaging device; 60 information providing screen; 61 cursor; 62 use input field; 63 device input field; 64 peripheral device input field; 65 application input field; 66 workpiece input field; 67 image display field; 68 specification output key; 69 virtual processing execution key; 70 processing condition input key; 71 stop key; 72 processing condition input screen; 73 processing list input field; 74 operation condition list input field; 75 decision key; W workpiece

The invention claimed is:

1. An information providing device used in a work system including a work robot configured to perform a predetermined work on a workpiece, the information providing device comprising:
a storage section which registers and stores information on a plurality of structures related to the work robot and information on a plurality of processing models related to the structures, the information on the structures including information on a connection portion for connecting with another structure; and
a processor configured to:
cause a display to display a structure input field,
accept user selection of a first structure of the structures via the structure input field,
read the information on the first structure from the storage section,
cause the display to selectively display at least one second structure of the structures that is connectable to the first structure as determined based upon the information on the connection portion, non-connectable structures of the structures, as determined based upon the information on the connection portion, being non-selectable,
accept user selection of one of the at least one second structure via the structure input field,
read the information on the one of the at least one second structure from the storage section,
accept user input of one or more of the processing models corresponding to at least one of the first structure and the one of the at least one second structure,
read the information on the one or more of the processing models from the storage section,
execute an operation of performing a work on a virtual workpiece in a virtual space by processing the one or more of the processing models in a state in which the first structure and the one of the at least one second structure are connected in the virtual space using the information on the first structure and the one of the at least one second structure and the information on the one or more of the processing models,
determine whether a malfunction occurs based on an executed processing result, the malfunction including a virtual representation of the work robot dropping the virtual workpiece in the virtual space;
output an indication of the malfunction when the malfunction occurs to elicit corrective action, and
output the executed processing result when the malfunction does not occur,
wherein the work system executes a series of processes to perform the predetermined work on the workpiece.

2. The information providing device according to claim 1, wherein the processor is configured to:
construct a virtual representation of the work system by combining the first structure, the one of the at least one second structure, and the one or more of the processing models in the virtual space,
cause the virtual representation of the work system to operate in the virtual space according to the operation,
determine whether the operation of performing the work has been normally executed, and
output a determination result.

3. The information providing device according to claim 2, wherein, the processor is configured to, when the operation of performing the work in the virtual space is normally executed, output design specification information of the work system based on the information on the first structure and the one of the at least one second structure and the information on the one or more of the processing models.

4. The information providing device according to claim 1, wherein the processor is configured to output design specification information based on the information on the first structure and the one of the at least one second structure and the information on the one or more of the processing models of the executed processing result when specification output information is acquired after outputting the executed processing result.

5. The information providing device according to claim 1, wherein the processor is configured to:
acquire processing condition information including a processing condition to be applied to the first structure, the one of the at least one second structure, and the one or more of the processing models, and
execute processing of the one or more of the processing models in the virtual space in a state in which the acquired processing condition is applied and the first structure and the one of the at least one second structure are connected.

6. The information providing device according to claim 1, wherein
the work system is configured to execute actual processing by applying the information on the one or more of the processing models as it is, and
the processor is configured to output a list of the one or more of the processing models of the executed processing result as an execution job for incorporating into the work system when order information is acquired after outputting the executed processing result.

7. The information providing device according to claim 1, wherein the structures include at least one of the work robot, a supply device, a conveyance device, an imaging device, an end effector for executing processing on the workpiece, and a portion thereof.

8. The information providing device according to claim 1, wherein the information on the structures includes at least one of shape data, structure condition data, and material data.

9. The information providing device according to claim 1, wherein the processing models include at least one of movement processing, pick-up processing, arrangement processing, direction conversion processing, incorporation processing, image capturing processing, and image processing using the workpiece.

10. The information providing device according to claim 1, wherein the processor is configured to output design specification information to construct the work system.

11. The information providing device according to claim 1, wherein the processor is configured to output the series of processes executed by the operation of performing the work on the virtual workpiece in the virtual space to obtain the executed processing result.

12. An information providing device used in a work system including a work robot for performing a predetermined work on a workpiece, the information providing device comprising:
a storage section which registers and stores information on a plurality of structures related to the work robot and information on a plurality of processing models related to the structures, the information on the structures including information on a connection portion for connecting with another structure; and a processor configured to:
cause a display to display a structure input field,
accept user selection of a first structure of the structures via the structure input field,
cause the display to selectively display at least one second structure of the structures that is connectable to the first structure as determined based upon the information on the connection portion, non-connectable structures of the structures, as determined based upon the information on the connection portion, being non-selectable,
accept user selection of one of the at least one second structure via the structure input field,
accept user input of one or more of the processing models corresponding to at least one of the first structure and the one of the at least one second structure,
construct a virtual representation of the work system by combining the first structure, the one of the at least one second structure, and the one or more of the processing models in a virtual space,
cause the virtual representation of the work system to operate in the virtual space to execute an operation of performing a work on a virtual workpiece in the virtual space using the information on the first structure and the one of the at least one second structure and the information on the one or more of the processing models,
determine whether the operation of performing the work has been normally executed,
output an indication of malfunction when the operation of performing the work has not been normally executed, the malfunction including a virtual representation of the work robot dropping the virtual workpiece in the virtual space, the indication eliciting corrective action, and
output a determination result when the operation of performing the work has been normally executed,
wherein the work system executes a series of processes to perform the predetermined work on the workpiece.

13. The information providing device according to claim 12, wherein the determination result includes the series of processes executed by the operation of performing the work on the virtual workpiece in the virtual space.

14. An information providing method used in a work system including a work robot that performs a predetermined work on a workpiece, the method comprising:
causing a display to display a structure input field;
accepting user selection of a first structure via the structure input field;
reading information on the first structure, the information on the first structure including information on a connection portion for connecting with another structure;
causing the display to selectively display at least one second structure that is connectable to the first structure as determined based upon the information on the connection portion, non-connectable structures, as determined based upon the information on the connection portion, being non-selectable;
accepting user selection of one of the at least one second structure via the structure input field;
reading information on the one of the at least one second structure;

accepting user input of one or more of a plurality of processing models corresponding to at least one of the first structure and the one of the at least one second structure;
reading information on the one or more of the processing models;
executing an operation of performing a work on a virtual workpiece in a virtual space by processing the one or more of the processing models in a state in which the first structure and the one of the at least one second structure are connected in the virtual space using the information on the first structure and the one of the at least one second structure and the information on the one or more of the processing models;
determining whether a malfunction occurs based on an executed processing result, the malfunction including a virtual representation of the work robot dropping the virtual workpiece in the virtual space;
outputting an indication of the malfunction when the malfunction occurs to elicit corrective action; and
outputting the executed processing result when the malfunction does not occur,
wherein the work system executes a series of processes to perform the predetermined work on the workpiece.

15. A non-transitory computer-readable medium encoded with computer-readable instructions that, when executed by a processor, cause the processor to perform the information providing method according to claim 14.

16. The information providing method according to claim 14, further comprising outputting the series of processes executed by the operation of performing the work on the virtual workpiece in the virtual space to obtain the executed processing result.

17. An information providing method used in a work system including a work robot that performs a predetermined work on a workpiece, the method comprising:
causing a display to display a structure input field;
accepting user selection of a first structure via the structure input field;
causing the display to selectively display at least one second structure that is connectable to the first structure as determined based upon information on a connection portion for connecting the first structure with another structure, non-connectable structures, as determined based upon the information on the connection portion, being non-selectable;
accepting user selection of one of the at least one second structure via the structure input field;
accepting user input of one or more of a plurality of processing models corresponding to at least one of the first structure and the one of the at least one second structure,
constructing a virtual representation of the work system by combining the first structure, the one of the at least one second structure, and the one or more of the processing models in a virtual space;
causing the virtual representation of the work system to operate in the virtual space to execute an operation of performing a work on a virtual workpiece in the virtual space using information on the first structure and the one of the at least one second structure and information on the one or more of the processing models;
determine whether the operation of performing the work has been normally executed;
outputting an indication of malfunction when the operation of performing the work has not been normally executed, the malfunction including a virtual representation of the work robot dropping the virtual workpiece in the virtual space, the indication eliciting corrective action; and outputting a determined result when the operation of performing the work has been normally executed, wherein the work system executes a series of processes to perform the predetermined work on the workpiece.

18. A non-transitory computer-readable medium encoded with computer-readable instructions thereon that, when executed by a processor, cause the processor to perform the information providing method according to claim 17.

19. The information providing method according to claim 17, wherein the determination result includes the series of processes executed by the operation of performing the work on the virtual workpiece in the virtual space.

\* \* \* \* \*